(12) United States Patent
Shimizu

(10) Patent No.: US 6,691,506 B2
(45) Date of Patent: Feb. 17, 2004

(54) DEVICE AND METHOD FOR CONTROLLING VARIABLE VALVE TIMING OF INTERNAL COMBUSTION ENGINE

(75) Inventor: Hirokazu Shimizu, Atsugi (JP)

(73) Assignee: Unisia Jecs Corporation, Kanagawa-Ken (JP)

(*) Notice: Subject to any disclaimer, the term of this patent is extended or adjusted under 35 U.S.C. 154(b) by 142 days.

(21) Appl. No.: 09/989,449

(22) Filed: Nov. 21, 2001

(65) Prior Publication Data

US 2002/0062800 A1 May 30, 2002

(30) Foreign Application Priority Data

Nov. 29, 2000 (JP) .......................... 2000-362274

(51) Int. Cl.$^7$ ............................................... F01N 3/00
(52) U.S. Cl. .................... 60/284; 60/285; 123/90.15
(58) Field of Search ................ 60/284, 285; 123/90.15, 123/90.16, 90.17

(56) References Cited

U.S. PATENT DOCUMENTS 5,535,586 A * 7/1996 Ohta et al. ..................... 60/285
5,698,779 A * 12/1997 Yoshioka ..................... 73/118.2
5,848,529 A * 12/1998 Katoh et al. .................... 60/274
6,109,225 A * 8/2000 Ogita et al. ............... 123/90.15
6,266,957 B1 * 7/2001 Nozawa et al. ................ 60/284
6,276,334 B1 * 8/2001 Flynn et al. ................. 123/435
6,513,319 B2 * 2/2003 Nozawa et al. ................ 60/284

FOREIGN PATENT DOCUMENTS

JP      2000-008896         1/2000

* cited by examiner

Primary Examiner—Thomas Denion
Assistant Examiner—Diem Tran
(74) Attorney, Agent, or Firm—Sughrue, Mion, PLLC

(57) ABSTRACT

The reference valve timing for an intake valve and an exhaust valve are set based on operating conditions such as an engine load, an engine rotation speed and the like. A cold state of the engine is detected, and when an air-fuel ratio is set to lean during the cold state, the valve timing of the intake and exhaust valves are controlled so that the opening timing of the exhaust valve is retarded with respect to the reference valve timing while reducing a valve overlap amount.

12 Claims, 4 Drawing Sheets

WHEN AIR-FUEL RATIO(A/F): $\lambda > 1$ (LEAN)

REDUCE O/L AND RETARD BOTH INTAKE/EXHAUST VALVES

WHEN AIR-FUEL RATIO(A/F): $\lambda \leq 1$ (STOICHIOMETRIC OR RICH)

FOR A PREDETERMINED PERIOD OF TIME AFTER STARTING ENGINE
ADVANCE BOTH INTAKE/EXHAUST VALVES WHILE ENSURING O/L

DEVICE AND METHOD FOR CONTROLLING VARIABLE VALVE TIMING OF INTERNAL COMBUSTION ENGINE

FIELD OF THE INVENTION

The present invention relates to variably controlling the opening/closing timing of an intake valve and an exhaust valve of an internal combustion engine, and especially relates a technique for reducing the HC emission at the engine cold.

DESCRIPTION OF THE RELATED ART

At the engine cold, since a large amount of unburned HC is included in the exhaust due to the low combustion temperature, and also the exhaust purifying catalyst is not yet activated due to the low exhaust temperature, an HC emission amount is likely to be increased. Especially at the end of exhaust stroke, the unburned HC adhered to an inner wall of cylinder is peeled off to be discharged, which leads to a further increase in the HC emission amount from the cylinder.

According to Japanese Unexamined Patent Publication No. 2000-8896, a variable valve mechanism is equipped to an intake valve, and at the engine cold, the opening timing of the intake valve is controlled to an advance angle so as to increase a valve overlap amount. Accordingly, the HC of small molecular weight generated around the top dead center is sucked back to an intake system, and an HC amount residing within the cylinder is increased, so as to be combusted by a next stroke, thereby achieving the reduction of the emission of unburned HC.

However, when the opening timing of the intake valve is advanced and the valve overlap amount is increased, since the combustion temperature is too much reduced due to an increase in the internal EGR, there is a possibility of deterioration of operating performance.

Especially, in a lean combustion by a lean mixture in a specific operation region, that is, in a lean combustion at the engine cold where the engine is operated the lean mixture, the combustion temperature is reduced by the internal EGR even the normal setting of the valve overlap amount, so that a large amount of unburned HC exists inside the cylinder to deteriorate the combustion performance. As a result, the amount of HC discharged from the cylinder is increased.

Moreover, since the exhaust purifying catalyst is not activated, the purifying efficiency of HC is degraded, and it is difficult to reduce the HC effectively.

SUMMARY OF THE INVENTION

The present invention has been achieved in view of the aforementioned problems in the conventional technique and an object of the invention is to reduce the HC emission at the engine cold, without deteriorating the operating performance of an engine.

In order to achieve the above object, according to the preset invention, the valve timing of an intake valve and an exhaust valve is controlled as follows.

It is detected that an engine is in a cold state, and if an air-fuel ratio is set to be lean at the engine cold, the opening timing of the exhaust valve is controlled to a retard angle side with respect to a reference valve timing set based on operating conditions, such as, an engine load, an engine rotation speed and the like, while reducing a valve overlap amount where the opening timing of the intake valve and the opening timing of the exhaust valve overlap with each other,.

According to such a constitution, the opening timing of the exhaust valve is retarded to accelerate the oxidation of unburned HC in an expansion stroke, while reducing an amount of the internal EGR (burned gas amount) to secure a good engine combustion, thereby reducing the HC emission.

The other objects and features of the present invention will become understood from the following description with the accompanying drawings.

DETAILED DESCRIPTION OF THE PREFERRED EMBODIMENT

An embodiment of the present invention will now be explained with reference to the drawings.

Figure 1:
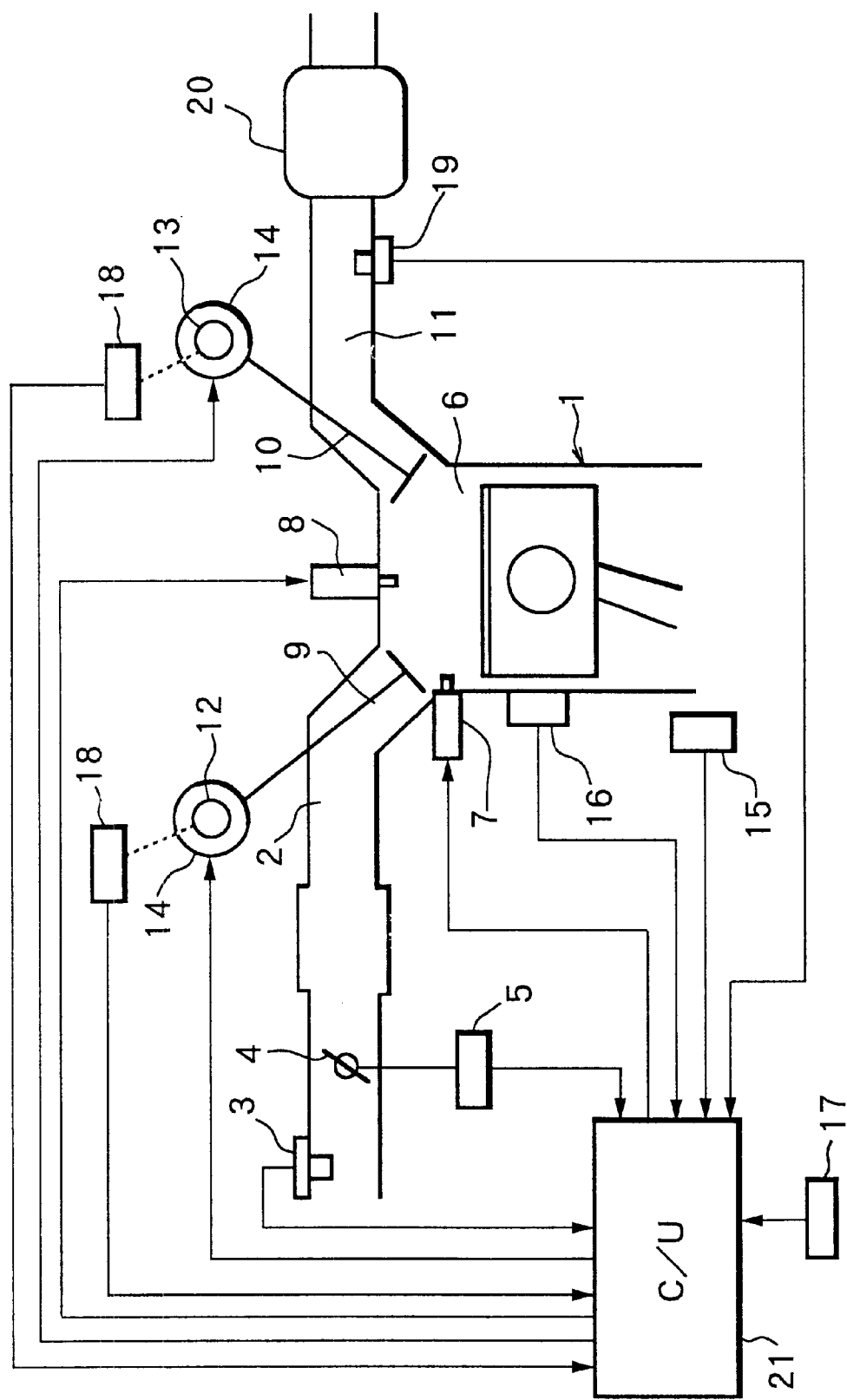
FIG. 1 is a diagram showing the system structure of an embodiment according to the present invention.

In FIG. 1 showing a system structure of the embodiment, an intake passage 2 of an engine 1 is provided with an air flow meter 3 for detecting an intake air flow quantity Q, and a throttle valve 4 is used to control the intake air flow quantity Q. A throttle sensor 5 is mounted to throttle valve 4 for detecting the opening of throttle valve 4, and throttle sensor 5 incorporates therein an idle switch to be turned ON in an idling state where the opening of throttle valve 4 is equal to or below a predetermined opening.

Each cylinder of engine 1 is equipped with a fuel injection valve 7 for injecting fuel into a combustion chamber 6, and an ignition plug 8 that performs spark ignition in combustion chamber 6. Fuel is injected from fuel injection valve 7 to the air sucked in through an intake valve 9 to form an air-fuel mixture. The formed air-fuel mixture is compressed within combustion chamber 6 and then spark ignited by ignition plug 8.

The exhaust from engine 1 is discharged from combustion chamber 6 through an exhaust valve 10 to an exhaust passage 11, to be discharged into the atmosphere through an exhaust purifying catalyst 20 and a muffler not shown.

Here, exhaust purifying catalyst 20 is equipped with a catalyst temperature sensor not shown, and the activation state of exhaust purifying catalyst 20 can be judged by a catalyst temperature signal from the catalyst temperature sensor.

Moreover, an air-fuel ratio sensor 19 is disposed to exhaust passage 11 for detecting an exhaust air-fuel ratio. An air-fuel ratio feedback control is performed so as to obtain a target air-fuel ratio set.

Intake valve 9 and exhaust valve 10 are each respectively driven to open or close by cams mounted respectively to an intake side camshaft 12 and an exhaust side camshaft 13.

Intake side camshaft 12 and exhaust side camshaft 13 are each equipped with a variable valve timing mechanism 14 that advances or retards the opening/closing timing of valve by changing a rotational phase of the camshaft relative to a crankshaft.

A C/U (control unit) 21 incorporates therein a microcomputer, and based on various detection signals input thereto, performs the setting of fuel injection quantity and fuel injection timing of fuel injection valve 7, the setting of ignition timing of ignition plug 8, the setting of air-fuel ratio and the like. The various detection signals input to C/U 21 include an intake air quantity signal from air flow meter 3, a crank angle signal from a crank angle sensor 15, a cooling water temperature signal of the engine from a water temperature sensor 16, an ON/OFF signal from a start switch 17, an ON/OFF signal from the idle switch, an air-fuel ratio signal from air-fuel ratio sensor 19, the catalyst temperature signal from the catalyst temperature sensor and the like. A rotation speed Ne of the engine is computed based on the crank angle signal.

Moreover, C/U 21 detects a rotational phase of intake side camshaft 12 relative to the crankshaft and a rotational phase of exhaust side camshaft 13 relative to the crankshaft based on the detection signal output from crank angle sensor 15 and detection signals respectively output from an intake side cam sensor 18 and an exhaust side cam sensor 18, thereby detecting the opening/closing timing of the intake valve and the exhaust valve. Further, C/U 21 determines target advance angle values or target retard angle values of the phases of intake side camshaft 12 and exhaust side camshaft 13, based on information concerning an engine load, the engine rotation speed Ne, the cooling water temperature Tw and the like, to control the opening/closing timing of the intake valve and the exhaust valve.

Figure 2:
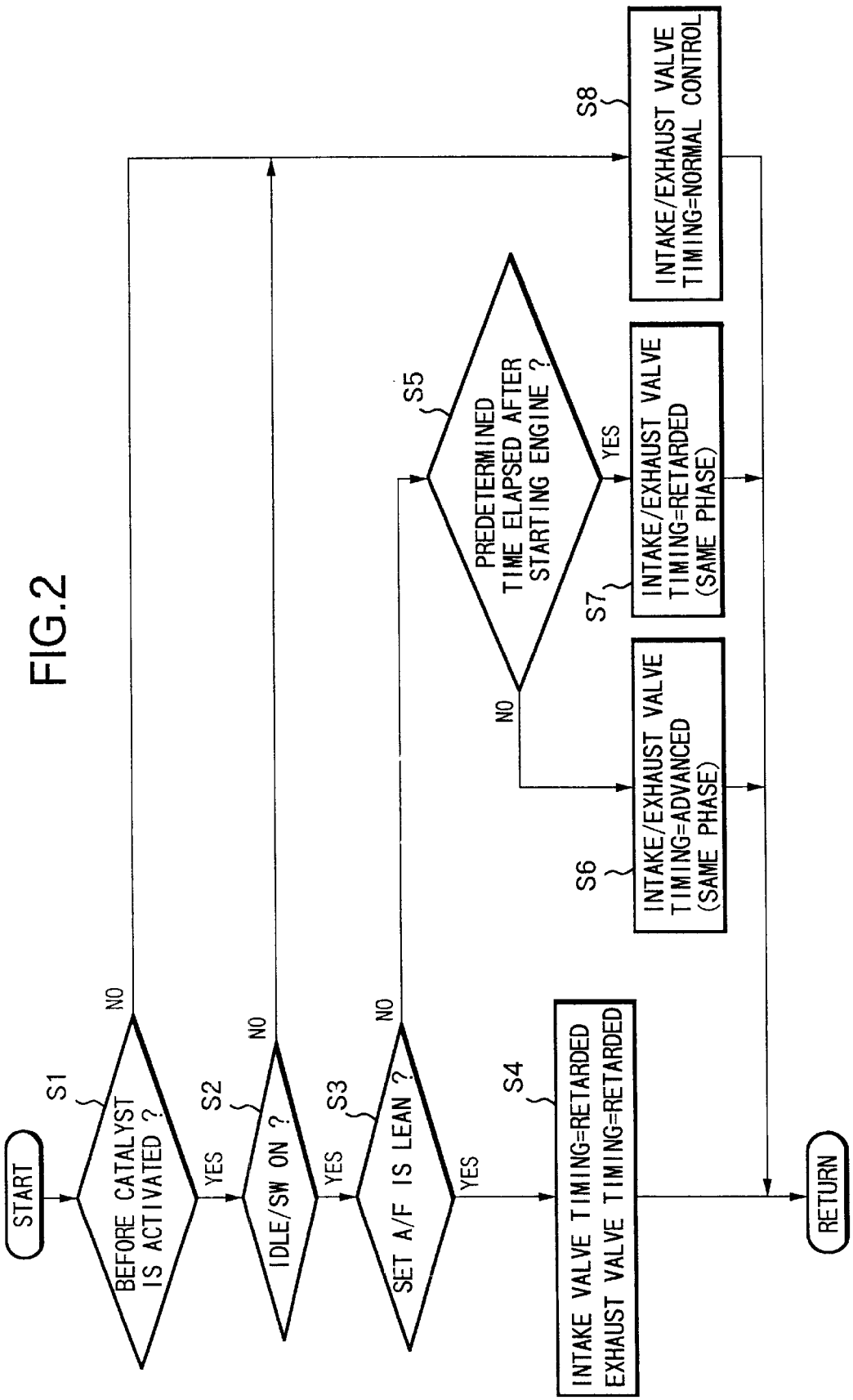
FIG. 2 is a flowchart showing a variable valve timing control of the embodiment according to the present invention.

Next, a flowchart of FIG. 2 shows a valve timing control of the intake valve and the exhaust valve at the engine cold by C/U 21 (in the present embodiment, in an idling state before the exhaust purifying catalyst is activated).

In FIG. 2, at step 1 (to be referred to as S1 in the figure, the same rule is applied to the followings), it is judged whether or not the exhaust purifying catalyst is activated. This judgment is performed based on the output signal from the catalyst temperature sensor, as mentioned above.

At step 2, it is judged whether the idle switch is ON or OFF in order to detect whether or not the engine is in the idling state. If the idle switch is ON, the procedure advances to step 3.

At step 3, it is judged whether the air-fuel ratio (A/F) set based on the operating conditions of the engine is lean ($\lambda > 1$) or not.

Here, the air-fuel ratio (A/F) is set based on the operating conditions of the engine such as the load, the rotation speed Ne and the like.

If the air-fuel ratio (A/F) is set to be lean, the procedure advances to step 4.

At step 4, the opening timing of the exhaust valve is controlled to a retard angle side (shown by a solid line in FIG. 3) with respect to a reference valve timing (shown by a broken line in FIG. 3) normally set during other engine states than the cold state based on the operating conditions of the engine while reducing a valve overlap amount (O/L) where the opening timing of the intake valve and the exhaust valve overlap to approximately 0.

Figure 3:
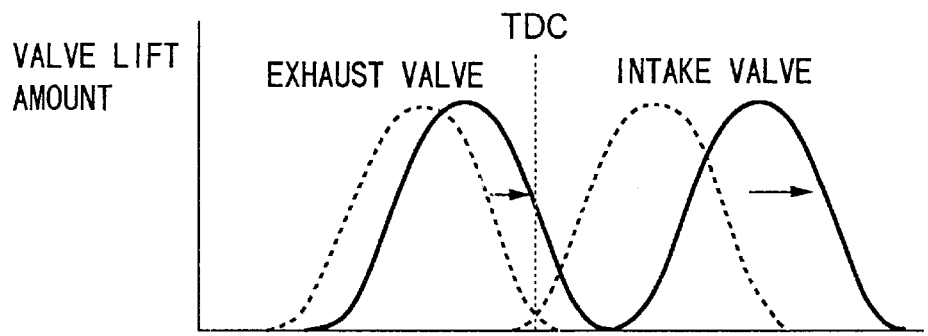
FIG. 3 is a graph showing the opening/closing timing of an intake valve and an exhaust valve when an air-fuel ratio is set to be lean at the engine cold.

That is, as shown in FIG. 3, the valve timing of the intake valve and the exhaust valve are both retarded by predetermined angles, respectively. At this time, a valve timing retard amount of the intake valve is set larger than a valve timing retard amount of the exhaust valve, so that the valve overlap amount is reduced.

By controlling the valve timing as explained above, the combustion performance (as well as the operation performance) is secured and the HC emission is reduced as explained in the following, when the lean combustion is performed at the engine cold.

That is, in the lean combustion, since a residual oxygen concentration within the cylinder is high, the HC emission can be effectively reduced by accelerating the oxidation of unburned HC (oxidation after the combustion (flame propagation) caused by the heat generated during combustion) in the expansion stroke.

The oxidation of unburned HC in the expansion stroke is known to depend on the residual oxygen concentration (quantity), the retention temperature and retention time of the unburned HC.

Therefore, by reducing the valve overlap amount (more preferably to reducing the valve overlap amount to approximately 0) as mentioned above, the internal EGR is utmost minimized to stabilize the combustion, and the combustion temperature is raised.

Further, by retarding the opening timing of the exhaust valve, the retention time at the high temperature of the unburned HC residing in the cylinder is lengthened so as to accelerate the oxidation of the unburned HC.

In this way, in the lean combustion at the engine cold, the HC emission is reduced while securing the operation performance of the engine.

On the other hand, at step 3, if the set air-fuel ratio (A/F) is not lean, in other words, if the air-fuel ratio (A/F) is set to be stoichiometric or rich ($\lambda \leq 1$), the procedure advances to step 5.

At step 5, it is judged whether or not a predetermined period of time has elapsed from the starting of the engine.

This predetermined period of time is to apprehend the temperature condition of the engine, and it is used to judge whether or not the engine temperature has been raised to the temperature where an influence on the exhaust by the unburned HC adhered to the inner wall of the cylinder is sufficiently small.

Accordingly, the above predetermined period of time may be set based on the elapsed time from the starting of the engine or the number of cycles from the starting of the engine with the relation thereof with the engine temperature being already known, or a lapse of the predetermined period of time may be judged by directly detecting the cooling water temperature Tw of the engine.

If the predetermined period of time has not elapsed (in other words, if the engine temperature has not been raised to the predetermined temperature), the procedure advances to step 6.

Figure 4:
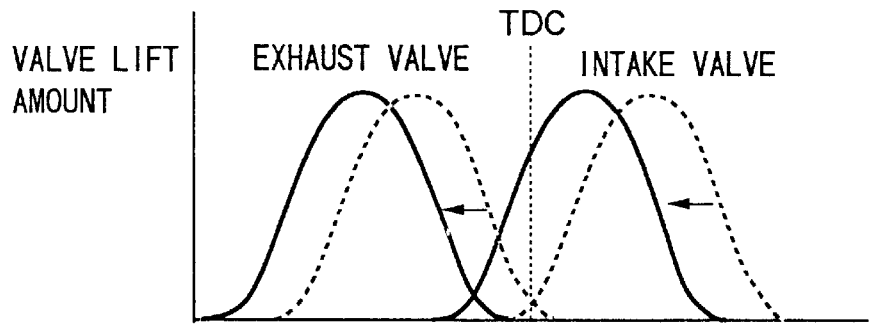
FIG. 4 is a graph showing the opening/closing timing of the intake valve and the exhaust valve when the air-fuel ratio is set to be stoichiometric or rich at the starting of the engine and at the engine cold during a predetermined period of time after starting the engine.

At step 6, as shown in FIG. 4, the valve timing of the intake valve and the exhaust valve are advanced for predetermined angles (shown by the solid line in FIG. 4) with respect to the reference valve timing normally set (shown in FIG. 4 by the broken line), while maintaining the valve overlap amount at approximately the same.

In this way, by controlling the valve timing as mentioned above, the emission of unburned HC in the stoichiometric or rich combustion at the starting of the engine and at the engine cold during the predetermined period of time after starting the engine, is reduced as explained hereinafter.

Figure 5:
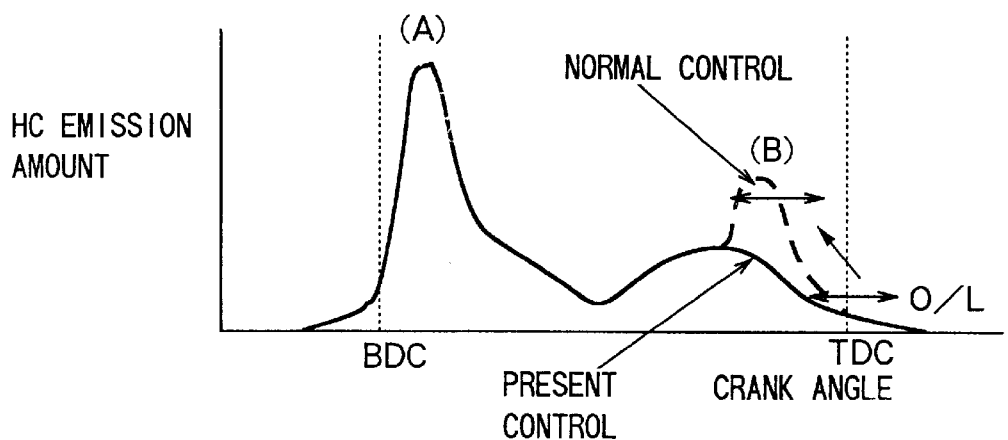
FIG. 5 is a graph showing an HC emission amount with respect to a crank angle when the air-fuel ratio is either stoichiometric or rich.

Generally, the HC emission performance of the engine has two peaks, that is, the early stage of exhaust stroke (part A in FIG. 5) and the last stage of the exhaust stroke (part B in FIG. 5).

It is considered that a large amount of HC is emitted during the early stage of exhaust stroke since the unburned HC residing around the exhaust valve is discharged, and a large amount of HC is emitted during the last stage of the exhaust stroke since the unburned HC adhered to the inner wall of the cylinder is peeled off to be discharged.

Since the engine immediately after started is at the low temperature, a large amount of fuel (unburned HC) is adhered to the inner wall of the cylinder. Therefore, it is necessary to suppress the emission of unburned HC at the last stage of the exhaust stroke (part B in FIG. 5) where the adhered fuel is peeled off from the wall to be discharged.

So, as shown by the arrow in FIG. 5, the valve overlap (O/L in the figure) center is advanced for a predetermined angle while maintaining valve overlap amount at approximately the same.

Thereby, a ratio of unburned HC included in the internal EGR is increased without increasing an internal EGR amount (residual gas amount), so that the unburned HC is combusted at a next stroke to thereby reduce the emission of unburned HC.

According to a more detailed explanation, in a normal control performed during other engine states than the cold state, only the exhaust valve is opened at the advance angle side from the exhaust top dead center where the piston rising speed is greater. Therefore, a strong exhaust flow is formed toward an exhaust port, and the unburned HC peeled off from the cylinder wall is strongly discharged with the exhaust.

Accordingly, during the valve overlap period thereafter, an amount of unburned HC again sucked into the cylinder is small, and as a result, the HC emission amount is increased (the broken line in FIG. 5).

On the other hand, according to the present control, the valve overlapped period is set to the advance angle side from the exhaust top dead center where the piston rising speed is greater, and further the intake valve is opened as well, so that the combustion gas is flown out distributively to the exhaust port and the intake port.

As a result, the exhaust flow speed is reduced, the amount of unburned HC to be peeled off from the cylinder wall is reduced. Further, the ratio of unburned HC flown out to the exhaust port is reduced, and the unburned HC flown out to the intake port is again sucked into the cylinder.

Thereby, the HC emission amount can be reduced greatly (the solid line in FIG. 5).

Since the valve overlap amount is maintained at approximately the same value, the internal EGR amount (burned gas) is prevented from increasing, securing not only the stable combustion performance but also stable operation performance.

Returning to step 5, if the predetermined period of time has elapsed from the starting of the engine (that is, if the engine temperature is raised to the predetermined temperature), the procedure advances to step 7.

Figure 6:
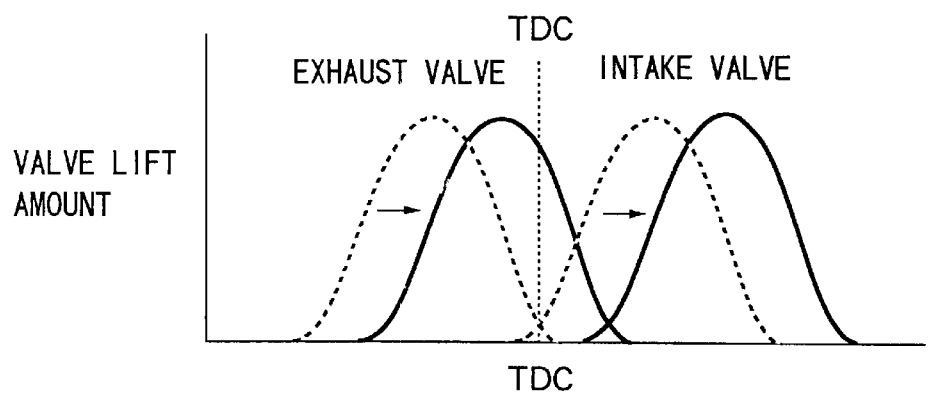
FIG. 6 is a graph showing the opening/closing timing of the intake valve and the exhaust valve when the air-fuel ratio is set either to stoichiometric or rich at the engine cold after a predetermined period of time has elapsed from the starting of the engine.

At step 7, as shown in FIG. 6, the valve timing of the intake valve and the exhaust valve are retarded for predetermined angles (shown by the solid line in FIG. 6) from the reference valve timing (shown by the broken line in FIG. 6) while maintaining the valve overlap amount at approximately the same.

In this way, by setting the valve timing as above, the emission of unburned HC in the stoichiometric or rich combustion at the engine cold after the predetermined time has elapsed from the starting of the engine is reduced by the following.

As explained above, the oxidation of unburned HC after combustion (expansion stroke) depends on the retention temperature and retention time of the unburned HC. Therefore, by retarding the reference valve timing for the predetermined angle, the opening timing of the exhaust valve is retarded, so that the retention time of the unburned HC in the cylinder the temperature of which has been raised by the elapse of predetermined time is lengthened so as to accelerate the oxidation of unburned HC, and the HC emission is reduced.

Further, the valve timing of the intake valve and the exhaust valve can be switched by switching the target air-fuel ratio, but the switching of the valve timing should preferably be performed gradually according to a change in air-fuel ratio so as to avoid an influence on the operation performance of the engine (to suppress load variation).

Moreover, in a case where the exhaust purifying catalyst is activated at step 1, or if the idle switch is OFF at step 2, the procedure skips the present control to advance to step 8, where the normal valve timing control performed during other engine states than the cold state is performed (normal control to set the valve timing based on the load and rotation speed of the engine).

As explained above, the HC emission at the engine cold can be effectively reduced while securing a good operation performance of the engine, irrespectively of the air-fuel ratio setting.

The entire contents of basic Japanese Patent Application No. 2000-362274 filed Nov. 29, 2000, of which priority is claimed, are herein incorporated by reference.

What is claimed:

1. A variable valve timing control device of an internal combustion engine comprising:

an internal combustion engine equipped with an exhaust purifying catalyst, and an intake valve and an exhaust valve, the opening/closing timing of which are variably controlled;

an engine cold determining unit that determines a cold state of the engine;

an operating condition detecting unit that detects operating conditions including an engine load and an engine rotation speed;

a reference valve timing setting unit that sets the reference valve timing of said intake valve and said exhaust valve based on the detected operating conditions;

an air-fuel ratio setting unit that sets an air-fuel ratio based on the detected operating conditions;

a cold state valve timing setting unit that sets the valve timing so that the opening timing of said exhaust valve is retarded with respect to said reference valve timing normally set during other engine states than the cold state, while reducing a valve overlap amount where the opening timing of said intake valve and said exhaust valve overlap with each other, when said air-fuel ratio is set to lean; and a valve timing adjusting mechanism that drives and adjusts said intake valve and said exhaust valve so that the valve timing of said intake valve and said exhaust valve reach the valve timing set by said cold state valve timing setting unit.

2. A variable valve timing control device of an internal combustion engine according to claim 1, wherein said cold state valve timing setting unit sets said valve overlap amount to approximately 0.

3. A variable valve timing control device of an internal combustion engine according to claim 1, wherein said cold state valve timing setting unit detects the starting of the engine and an elapsed time from the starting of the engine, and if the air-fuel ratio is set to be stoichiometric or rich at the starting of the engine and at the engine cold during a predetermined period of time after starting the engine, sets the valve timing so that a valve overlap center is advanced from an exhaust top dead center while maintaining the valve overlap amount at approximately the same, with respect to said reference valve timing.

4. A variable valve timing control device of an internal combustion engine according to claim 3, wherein at the time of engine cold after said predetermined period of time has elapsed, said cold state valve timing setting unit sets the valve overlap center to a retard angle side with respect to said reference valve timing, while maintaining the valve overlap amount at approximately the same.

5. A variable valve timing control device of an internal combustion engine according to claim 1, wherein said cold state determining unit detects an activation state of exhaust purifying catalyst and an idling state of the engine, to judge the idling state before the exhaust purifying catalyst is activated to be the engine cold.

6. A variable valve timing control device of an internal combustion engine according to claim 1, wherein said valve timing adjusting mechanism switches gradually the setting of the valve timing from an advance angle to a retard angle, or from the retard angle to the advance angle, with respect to said reference valve timing.

7. A variable valve timing control method for controlling the valve timing of an intake valve and an exhaust valve in an internal combustion engine having an exhaust purifying catalyst in an exhaust passage thereof, wherein a cold state of the engine is detected, and the valve timing of said intake valve and said exhaust valve are controlled so that the opening timing of said exhaust valve is retarded with respect to the reference valve timing normally set during other engine states than the cold state, while reducing a valve overlap amount where the opening timing of said intake valve and said exhaust valve overlap with each other, when an air-fuel ratio is set to lean.

8. A variable valve timing control method according to claim 7, wherein said valve overlap amount is set to approximately 0.

9. A variable valve timing control method according to claim 7, wherein the starting of the engine and an elapsed time from the starting of the engine are detected, and if the air-fuel ratio is set to be stoichiometric or rich at the starting of the engine and at the engine cold during the predetermined period of time after starting the engine, the valve timing of said intake valve and said exhaust valve are controlled so that a valve overlap center is advanced from an exhaust top dead center while maintaining the valve overlap amount at approximately the same, with respect to said reference valve timing.

10. A variable valve timing control method according to claim 9, wherein at the time of engine cold after said predetermined period of time has elapsed, the valve timing of said intake valve and said exhaust valve is controlled so that the valve overlap center is retarded with respect to said reference valve timing, while maintaining the valve overlap amount at approximately the same.

11. A variable valve timing control method according to claim 7, wherein said engine cold is an idling state before exhaust purifying catalyst is activated.

12. A variable valve timing control method according to claim 7, wherein the setting of the valve timing gradually switched from an advance angle to a retard angle, or from the retard angle to the advance angle, with respect to said reference valve timing.

* * * * *